United States Patent
Connors, Sr. et al.

(10) Patent No.: US 6,210,082 B1
(45) Date of Patent: Apr. 3, 2001

(54) METHOD FOR REPAIRING DIAMETRAL SURFACES OF GLASS MANUFACTURING MOLDS

(75) Inventors: Donald J. Connors, Sr., Temperance, MI (US); Mark E. Keister, Sharpsburg, GA (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/311,034

(22) Filed: May 13, 1999

(51) Int. Cl.[7] .................................... B23B 35/00
(52) U.S. Cl. ............................. 408/1 R; 65/27; 65/172; 29/527.6; 219/76.1; 408/54; 409/132; 409/140
(58) Field of Search ................ 408/1 R, 83.5, 408/171, 54; 407/42, 61; 409/132, 131, 139, 140, 199; 65/27, 171, 172, 173; 29/402.18, 527.6; 219/76.1, 76.12–76.17

(56) References Cited

U.S. PATENT DOCUMENTS

| | | | |
|---|---|---|---|
| 959,104 | * | 5/1910 | Barker ..................................... 407/52 |
| 2,369,587 | * | 2/1945 | Macafee ............................... 408/171 |
| 2,557,322 | | 6/1951 | Storrs . |
| 2,623,422 | | 12/1952 | Billingsley, Jr. . |
| 3,499,746 | * | 3/1970 | Blankenship et al. ................. 65/265 |
| 3,617,233 | | 11/1971 | Mumford . |
| 3,792,986 | * | 2/1974 | Scott et al. .............................. 65/27 |
| 4,397,669 | * | 8/1983 | Haisma et al. ..................... 65/30.14 |
| 4,623,374 | * | 11/1986 | Doud et al. .............................. 65/83 |
| 4,629,488 | * | 12/1986 | Doud et al. .............................. 65/83 |
| 5,411,564 | | 5/1995 | Bolin . |
| 5,662,436 | * | 9/1997 | Bishop .................................. 407/42 |
| 5,718,740 | | 2/1998 | Mann . |

FOREIGN PATENT DOCUMENTS

86108 * 5/1986 (JP) ..................................... 408/1 R

* cited by examiner

*Primary Examiner*—Steven C. Bishop

(57) ABSTRACT

A method of repairing a diametral surface of a mold of the type used in manufacturing glass containers by an I.S. machine, after a repair procedure that causes or can cause an out-of-roundness condition in the diametral surface. The method, which is applicable to the frusto-conical baffle match surface of a parison mold and to a compound cylindrical and frusto-conical bottom plate engaging surface of a blow mold, involves positioning a mold set with its separable semi-circular molds in end to end contact and contacting the diametral surface to be repaired, while the mold set is stationary, with a rotating reaming tool the tips of the removable blades of which define a surface that is complemental to the surface to be repaired.

11 Claims, 6 Drawing Sheets

METHOD FOR REPAIRING DIAMETRAL SURFACES OF GLASS MANUFACTURING MOLDS

FIELD OF THE INVENTION

This invention relates to the repair of diametral surfaces of molds used in the manufacture of hollow glass containers by a glass manufacturing machine of the I.S. ("Individual Section") type. More particularly, this invention relates to the repair of the baffle engaging surface of a first stage or blank mold of such a machine and to the repair of the bottom plate engaging surface of a second stage or blow mold of such a machine.

BACKGROUND OF THE INVENTION

U.S. Pat. No. 3,617,233 (Mumford), which was assigned to a predecessor of the assignee of this application, the disclosure of which is incorporated by reference herein, describes a glass forming machine of the I.S. type, which is a type of forming machine that is widely used in forming various types of hollow glass containers. As described in the '233 patent or as is otherwise known, an I.S. machine has a multitude of side-by-side machine sections, such as six, eight, ten or even twelve sections, and containers are formed in each section, usually two, three, or four at a time, in a two-stage process. In the first of the stages, preforms of the containers, which are often called parisons or blanks, are formed by pressing or blowing gobs of molten glass in a first set of molds, often called blank molds, with each parison being formed in an inverted orientation, that is, with its open end down. Each set of blank molds is made up of a separable pair of semi-cylindrical mold elements, which remain in end to end contact with one another throughout the blank molding step.

During the forming of glass parisons in an I.S. machine blank mold, the "finish" portion of each parison, which is the threaded or otherwise configured closure receiving portion at the open end, is formed by a separate annular neck mold, which is often referred to as a neck ring, each of which is made up of a separable pair of generally semi-cylindrical elements. The neck rings for each I.S. machine section are carried in a neck ring mechanism and remain in closing contact with the parisons at the conclusion of the blank molding step, when the elements of the blank molds separate to allow the parisons to be transferred to a second set of molds, often referred to as blow molds, for the blowing of parisons into containers in the final desired shape of the containers. The containers are held by the neck rings during their transfer from the blank molds to the blow molds, and the transfer is effected by inverting the neck ring mechanism through an arc of 180° to present the parisons, which remain grasped by the neck rings throughout the transfer step, at the blow molds, the parisons now being in upright orientations, with the finishes at the top, as a result of the inverting step.

At the blow mold station, each parison is blown into its final desired configuration in a second set of molds, each set of blow molds being made up of a separable pair of semi-cylindrical elements, which remain in end to end contact with one another throughout the blow molding step. At the conclusion of the blow molding step, the separable semi-cylindrical blow mold elements are separated, and the finished containers are removed for further processing.

From time to time during the useful lives of sets of I.S. machine molds, both blank molds and blow molds, it is necessary to remove each mold set for repair. During normal repair operations, the face or pad surfaces adjacent to their respective cavities are machined, as well as welding of glass contacting surfaces of the mold elements to replace material lost through abrasion from prior usage. However, these repair procedures can lead to an out of roundness condition in various diametral surfaces of the molds, such as the baffle engaging surfaces of blank molds (the baffle is identified by reference numeral 15 in the aforesaid '233 patent) and the bottom plate engaging surfaces of the blow molds. It is important that these diametral surfaces be as round as possible for proper manufacture of glass containers, and it is the repair of these otherwise out of round surfaces to which the present invention is directed.

BRIEF DESCRIPTION OF THE INVENTION

According to the present invention, important diametral surfaces of repaired sets of I.S. machine glass manufacturing molds can be rapidly and accurately restored to a suitable condition by reaming the surfaces of the molds, while the molds are stationary, as opposed to turning the molds on a lathe, which was the technique that was heretofore used for such a purpose. This greatly simplifies the handling involved in the repair process, because it eliminates the need to rapidly rotate the mold sets, which are very heavy and cumbersome, thus greatly decreasing the time consumed in accomplishing such repairs.

Accordingly, it is an object of the present invention to provide an improved method of repairing a diametral surface of a repaired set of I.S. machine glass mold sets.

More particularly, it is an object of the present invention to provide an improved method of repairing a baffle match surface of a repaired set of I.S. machine blank mold elements and to provide an improved method of repairing a bottom plate engaging surface of a repaired set of I.S. machine blow mold elements.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
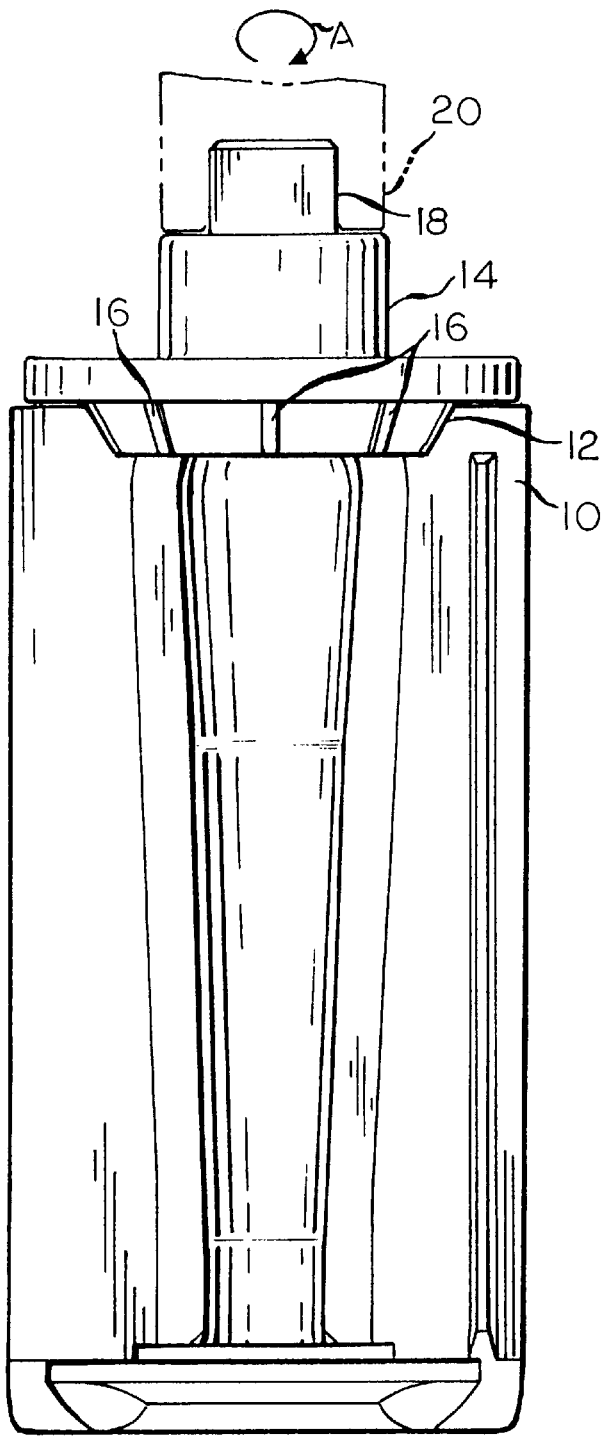
FIG. 1 is an elevational view, partly in cross-section, illustrating the practice of the present invention in connection with the repair of the baffle match diametral surface of a blank mold of an I.S. glass container forming machine.
Figure 2:
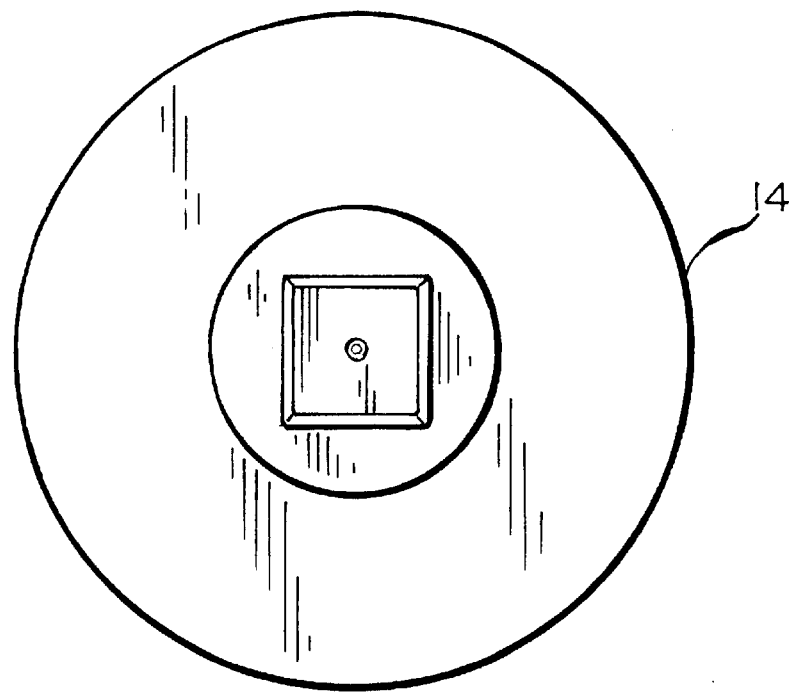
FIG. 2 is a top plan view of an element of the equipment shown in FIG. 1.
Figure 3:
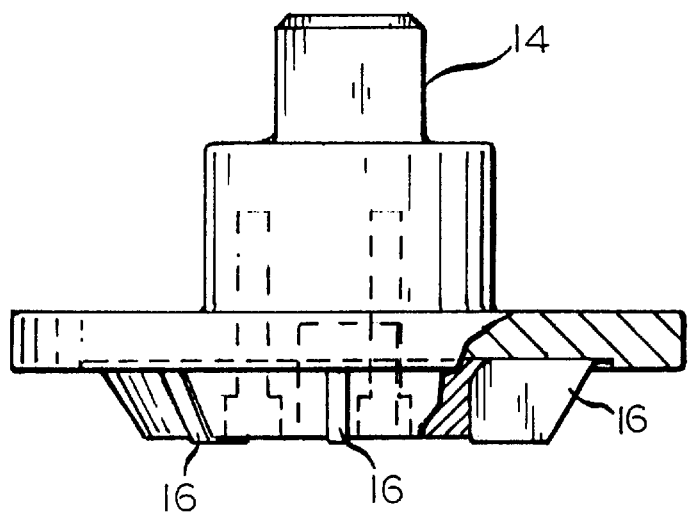
FIG. 3 is an elevational view, partly in cross-section of the element of FIG. 2.
Figure 4:
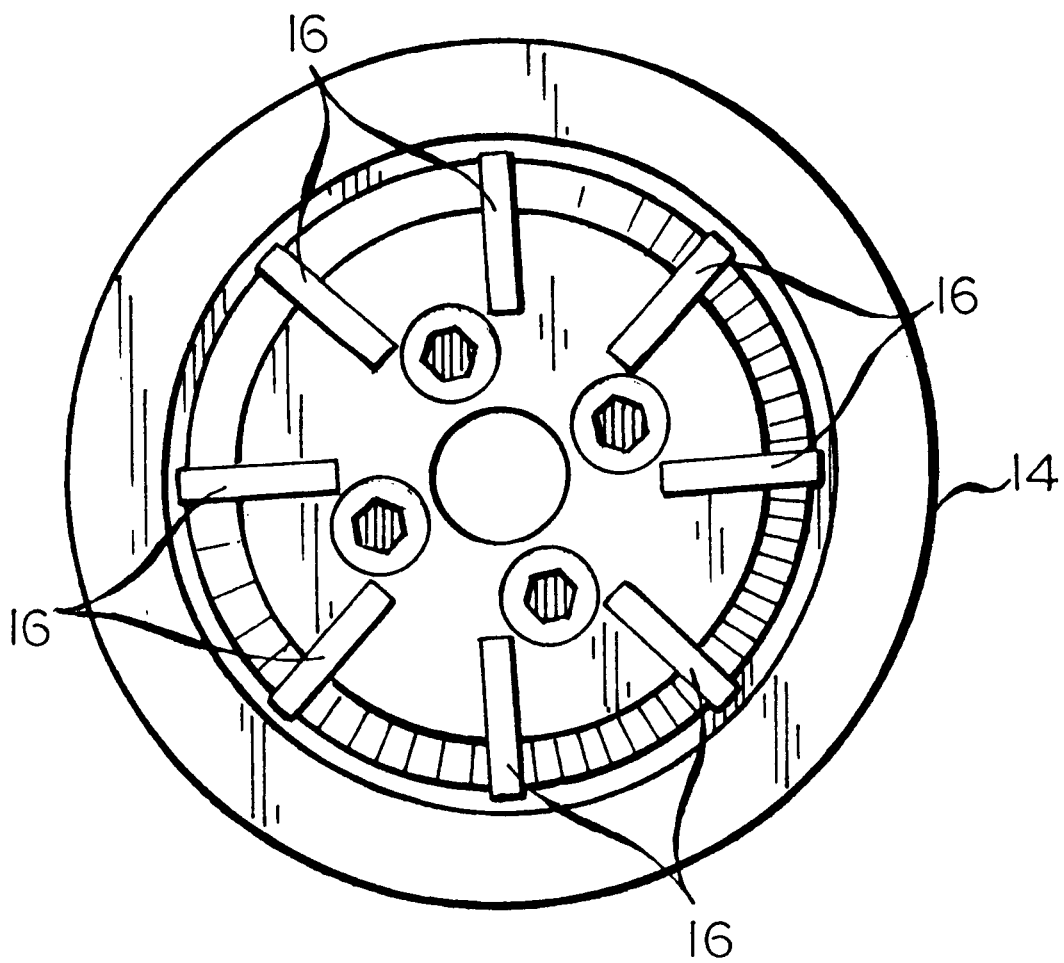
FIG. 4 is a bottom plan view of the element of FIGS. 2 and 3.

FIG. 1 illustrates a semi-cylindrical blank mold 10, which is one of a pair of separable like elements that are used to form a parison or blank of a glass container, by pressing or blowing, from a gob of molten glass. The mold 10 has a diametral baffle match surface 12 at its upper end, the surface 12 being frusto-conical in shape, to receive a baffle, not shown, after a gob of molten glass is deposited in the mold set that includes the mold 10 and its mating mold. In the repair of such mold set, the surface 12 can be put into an out-of-round condition, for example, by the build up of weld material on a surface of the mold 10 that mates with its counterpart mold, and it is important that the surface 12 be put back into a diametral state before the mold set is put back into operation so that there be no leakage of molten glass along the surface 12, between the mold 10 and the baffle used in conjunction therewith during the molding of glass parisons in the mold set that includes the mold 10.

To properly repair the surface 12, the mold 10 is positioned end to end with its mating mold, and a reaming tool 14 with a plurality of removable tool bits 16, whose outer tips define a frusto-conical surface that is complemental to the desired size and shape of the surface 12. While the mold set that includes the mold 10 is held stationary, with the mold 10 positioned end to end with its mating mold so that the surface 12 defines, with its counterpart in the mating mold, an endless surface of generally frusto-conical configuration. Then, the reaming tool 14 is advanced to engage the surface 12 and is slowly rotated, as is indicated by the arrow A in FIG. 1. To that end, the reaming tool 14 is provided with an extension 18 whose outer surface is square in configuration, or otherwise non-circular in configuration, to permit the tool 14 to be engaged by a chuck 20 of a power tool and/or a manual torque bar. At the conclusion of the reaming step, the mold 10 and its mating mold can be put back in operation with the assurance that the match between the baffle and the surface 12 will meet all applicable specifications therefor.

Figure 5:
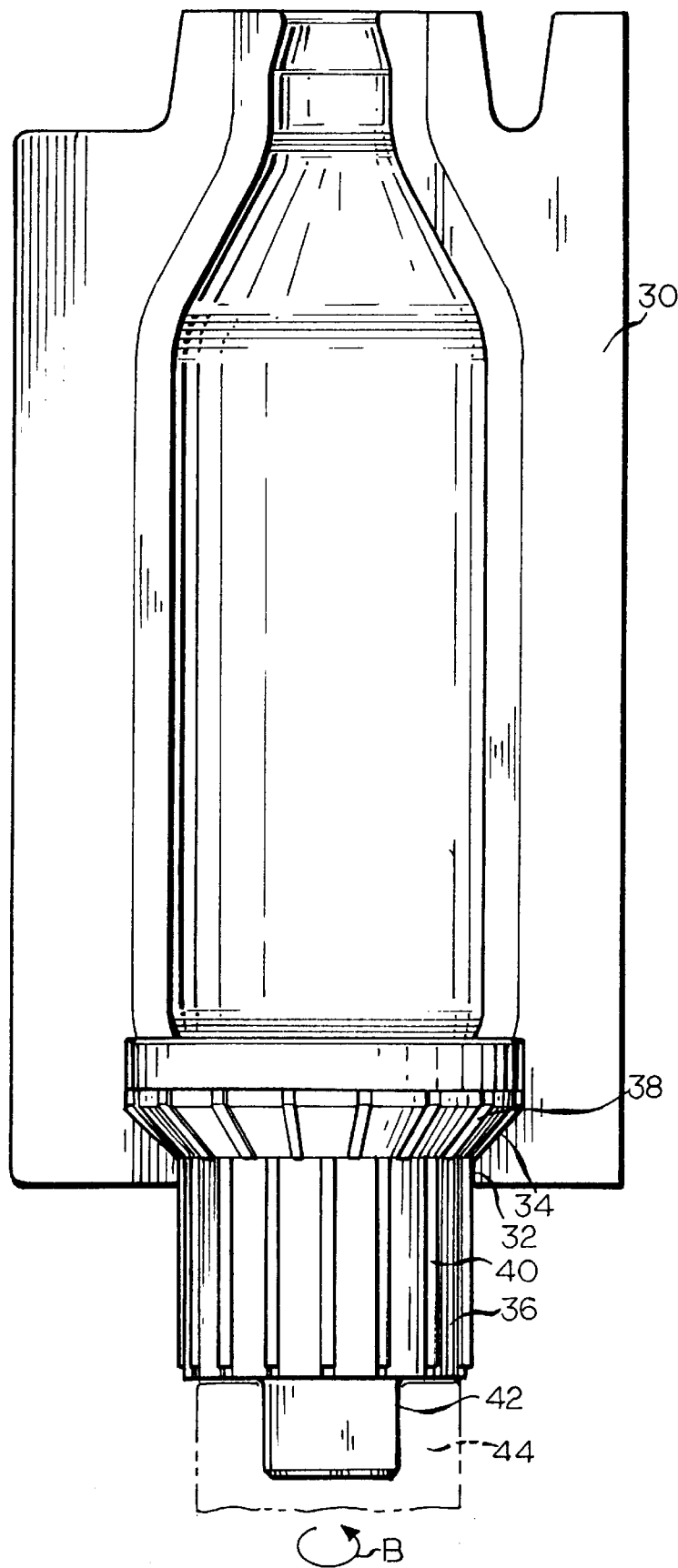
FIG. 5 is a view like FIG. 1 illustrating the practice of the present invention in connection with the repair of the diametral bottom plate match surfaces of a blow mold of an I.S. machine.
Figure 6:
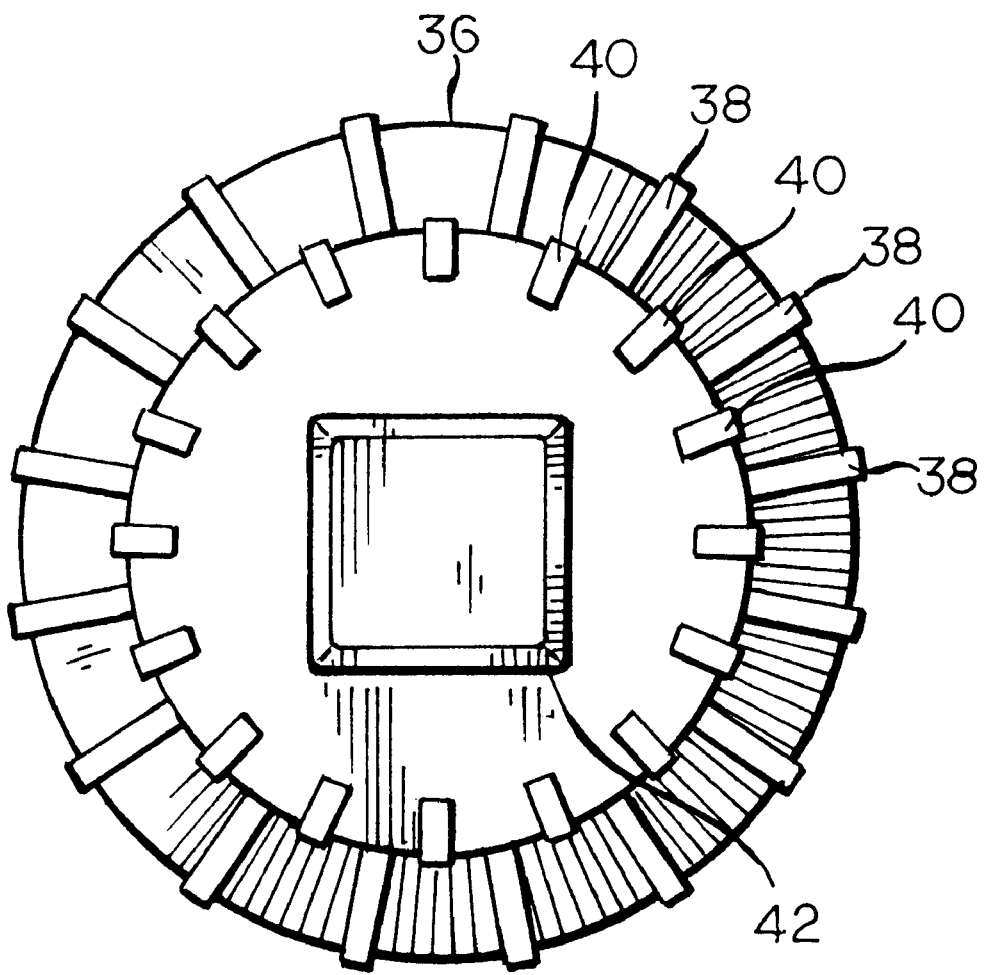
FIG. 6 is a bottom plan view of an element of the equipment shown in FIG. 5.
Figure 8:
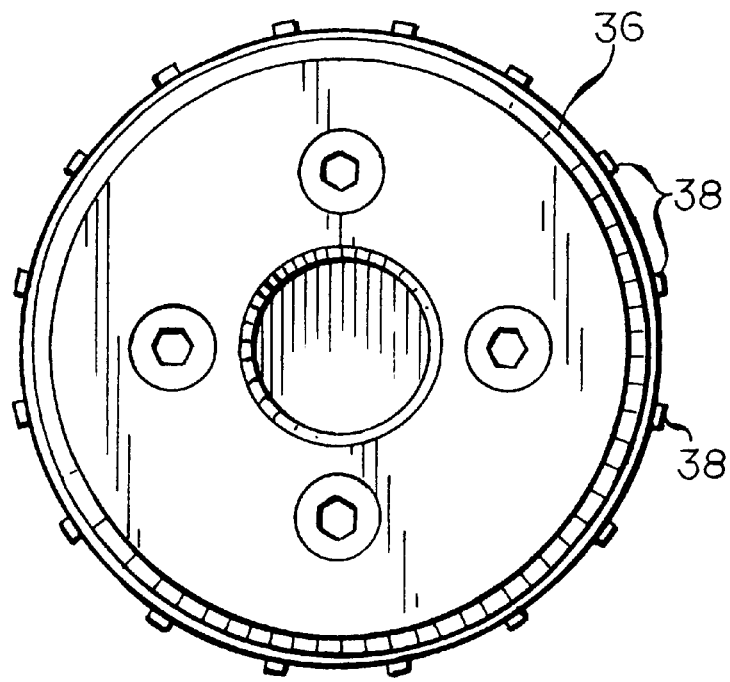
FIG. 8 is a top plan view of the element of FIGS. 5 and 6.
Figure 7:
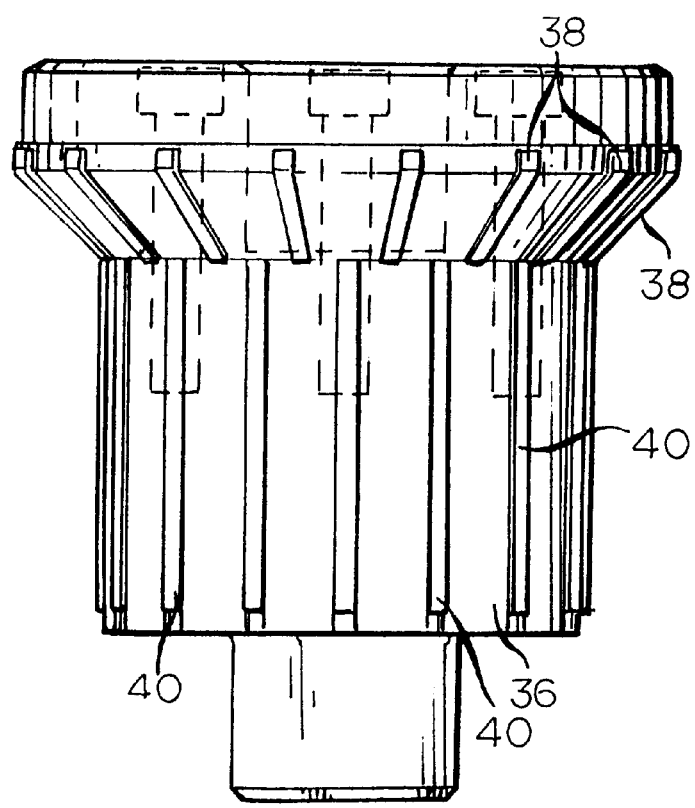
FIG. 7 is an elevation view of the element of FIG. 6.

FIG. 5 illustrates a semi-cylindrical blow mold 30 of a glass container forming machine of the I.S. type, which is one of a pair of separable like elements that are used to form a glass container from a parison or blank, by blowing. The mold 30 has an adjacent pair of diametral surfaces including an outermost surface 32, which is cylindrical in shape, and an innermost surface 34, which is frusto-conical in shape and extends upwardly and outwardly from the uppermost extent of the surface 32. The surfaces 32, 34 receive a bottom plate, not shown, after a parison is inserted into the mold set that includes the mold 30. In the repair of such mold set, each of the surfaces 32, 34 can be put into an out-of-round condition, for example, by the buildup of weld material on the mold 30 that mates with its counterpart mold, and it is important that each such surface 32, 34 be put back into a diametral state before the mold set is put back into operation so that there will be no leakage of molten glass along the surfaces 32, 34 and the bottom plate used in conjunction therewith during the blowing of glass containers from glass parisons in the mold set that includes the mold 30.

To properly repair the surfaces 32, 34, the mold 30 is positioned end to end with its mating mold and a reaming tool 36 with a plurality of removable blades 38 arranged in a frusto-conical configuration near its upper end and a plurality of removable blades 40 arranged in a cylindrical configuration beneath the removable blades 34. While the mold set that includes the mold 30 is held stationary, with the mold 30 positioned end to end with its mating mold so that its surface 32 defines, with its counterpart in the mating mold, a surface of generally cylindrical configuration, the reaming tool is advanced to engage the surfaces 32, 34 and is slowly rotated, as is indicated by the arrow B in FIG. 5. To that end, the reaming tool 36 is provided with an extension 42 whose outer surface is square in configuration, or otherwise non-circular in configuration, to permit the tool 36 to be engaged by a chuck 44 of a power tool and/or a manual torque bar. At the conclusion of the reaming step, the mold 30 and its mating mold are separated, to permit the reaming tool 36 to be removed, and can then be put back in operation with the assurance that the match between the bottom plate and the surfaces 32,34 will meet all applicable specifications therefor.

Although the best mode contemplated by the inventor for carrying out the present invention as of the filing date hereof has been shown and described herein, it is apparent to those skilled in the art that suitable modifications, variations, and equivalents may be made without departing from the scope of the invention, such scope being limited solely by the terms of the following claims and the legal equivalents thereof.

What is claimed:

1. A method of repairing an out-of roundness condition of a diametral surface defined by a mating pair of semi-cylindrical mold halves of an individual section glass container forming machine after repair of the mold halves by a process that causes an out of roundness condition in the diametral surface, the method comprising:

positioning the mold halves at a location away from the glass container forming machine with the mating surfaces of the mold halves in mating contact with one another; and contacting the diametral surface defined by the mold halves with a rotating reaming tool while the mold halves remain stationary.

2. The method of claim 1 wherein the mold halves are halves of a blank mold that is adapted to be used to form a preform of a glass container at a first stage of the glass container forming machine.

3. The method of claim 2 wherein the diametral surface is a baffle match surface of the blank mold and has a generally frusto-conical configuration.

4. The method of claim 1 wherein the mold halves are halves of a blow mold that is adapted to be used to form a glass container from a preform of a glass container at a second stage of the glass container forming machine.

5. The method of claim 4 wherein the diametral surface is a bottom plate register of the blow mold.

6. The method of claim 5 wherein the diametral surface comprises a cylindrical, outermost surface of the blow mold.

7. The method of claim 6 wherein the diametral surface further comprises a frusto-conical surface extending inwardly and outwardly from an uppermost limit of the generally cylindrical surface of the blow mold.

8. The method of claim 3 wherein the rotating reaming tool comprises a plurality of circumferentially spaced apart removable tool bits whose outer tips define a generally frusto-conical surface.

9. The method of claim 6 wherein the rotating reaming tool comprises a plurality of circumferentially spaced apart removable tool bits having outer tips that define a cylindrical surface.

10. The method of claim 9 wherein the rotating reaming tool comprises a second plurality of circumferentially spaced apart removable tool bits whose tips define a frusto-conical surface.

11. The method of claim 1 wherein the process that causes an out of roundness condition is a welding process that adds welding material to a surface of at least one of the mold halves that mates with a surface of the other mold half of the mating pair of semi-cylindrical mold halves.

* * * * *